(No Model.)
T. R. ROEMER.
SEAL LOCK.
No. 426,961. Patented Apr. 29, 1890.
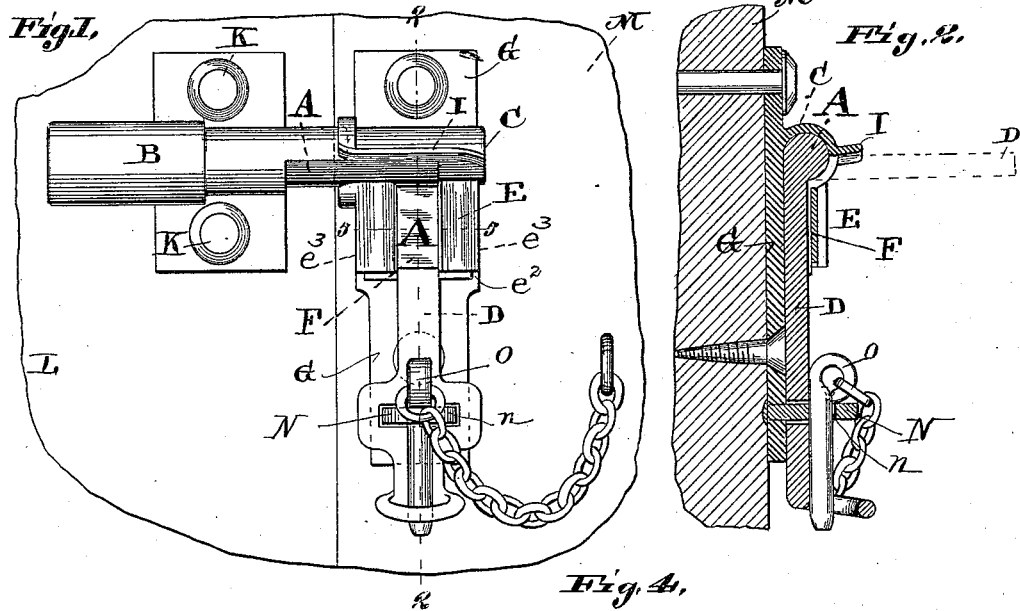
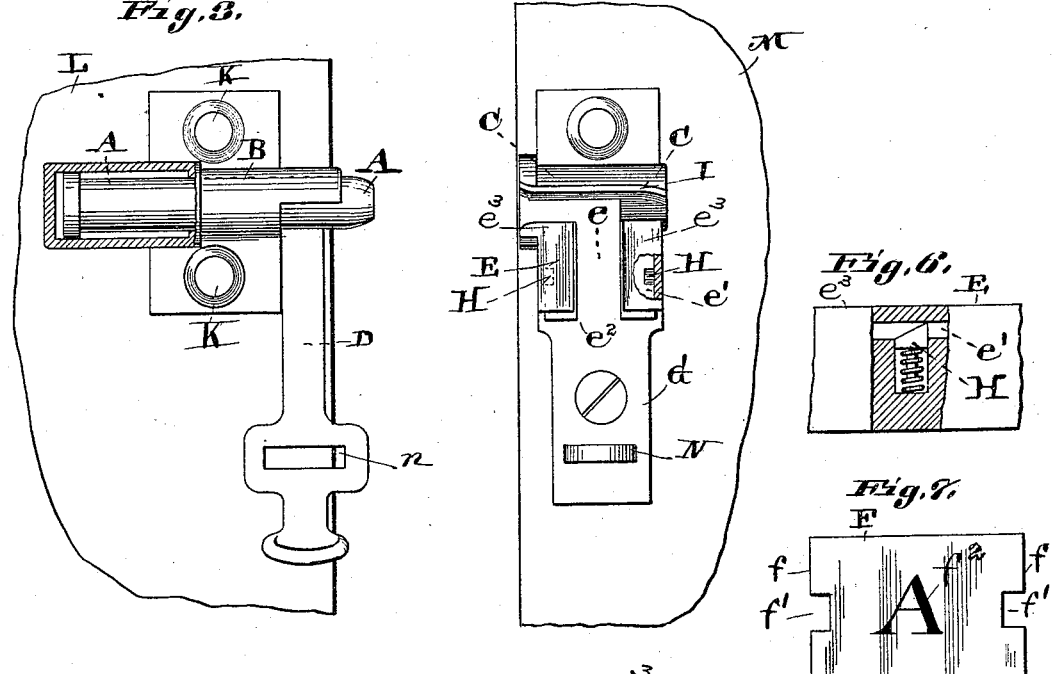
Attest:
T. W. Sanford
B. F. Rix
Inventor:
Thomas R. Roemer
by C. D. Moody
his atty

UNITED STATES PATENT OFFICE.

THOMAS R. ROEMER, OF ST. LOUIS, MISSOURI, ASSIGNOR, BY MESNE ASSIGNMENTS, TO JAMES H. BROOKMIRE, OF SAME PLACE.

SEAL-LOCK.

SPECIFICATION forming part of Letters Patent No. 426,961, dated April 29, 1890.

Application filed January 11, 1890. Serial No. 336,653. (No model.)

*To all whom it may concern:*

Be it known that I, THOMAS R. ROEMER, of St. Louis, Missouri, have made a new and useful Improvement in Seal-Locks, of which the following is a full, clear, and exact description.

In carrying out this improvement an ordinary sliding bolt and its keeper are employed, and the bolt in use is operated substantially in the ordinary manner; and the improvement consists in the structure and combination of the several parts of this device, all substantially as is hereinafter set forth and claimed, aided by the annexed drawings, making part of this specification, in which—

Figure 1 is a front elevation of the improved device in position, the bolt being shot out into the keeper and the bolt-arm being turned into the seal-lock and confined beneath the seal; Fig. 2, a section on the line 2 2 of Fig. 1; Fig. 3, a front elevation, partly in section, showing the bolt and its holder and the arm, which is attached to the bolt; Fig. 4, a front elevation, partly in section, showing the keeper and seal-holder; Fig. 5, a section on the line 5 5 of Fig. 1; Fig. 6, a detail, partly in section and on the line 6 6 of Fig. 5; and Fig. 7, a face view of the seal. The last three views are upon an enlarged scale.

The same letters of reference denote the same parts.

A represents the sliding bolt; B, its holder; C, its keeper, and D the arm attached to the bolt and co-operating with the seal-holder E and seal F. The keeper C and seal-holder E may in practice be attached to a single base-plate G and the seal-holder form an extension—say downward—of the keeper, substantially as shown.

The seal-holder is shaped to form a space $e$, into which the bolt-arm D can be turned, and above or without the space $e$ is a seat or rest $e'$ for the seal F, which, when inserted in its place in the seal-holder, serves to close the passage leading to and from the space $e$; hence when the bolt-arm has been turned into the space $e$ and the seal put in its rest in the holder the seal must be broken or removed before the bolt-arm can be withdrawn from the seal-holder; but the seal and the parts of the seal-holder therewith coacting are so contrived that the seal after being placed in its rest cannot be withdrawn therefrom without either breaking it or so marring or changing its form as to show the seal has been forcibly removed. To this end the seal is composed, say, of some brittle frangible substance—such as a piece of glass—and fitted to be slipped into the rest $e'$, which in turn is a pair of grooves, arranged, respectively, at the sides of the space $e$, and into which, respectively, the side edges $f\,f$ of the seal are received. The seal in practice is inserted from the lower end $e^2$ of the seal-holder; but I desire not to be restricted thereto. It is sufficient if it is in any manner inserted in the rest, and after being inserted held against removal, as described.

The most desirable means for retaining the seal in its rest are as follows: H H represent beveled bolts, which permit of the seal being inserted, but which after its insertion assume a position to block the withdrawal of the seal. In practice they are spring-actuated bolts, beveled to enable the entering seal to depress them into the sides $e^3\ e^3$ of the holder, to spring outward again to engage with the seal as soon as the seal is in position. The seal is notched at $f'\,f'$ to provide for the described engagement of the bolts.

I represents a lip attached, say, to the keeper, which serves to protect the seal-holder more or less from the weather. It may also act as a stop to limit the upward movement of the bolt-arm, as indicated by the broken lines, Fig. 2.

The seal F may be of any suitable material, and, as illustrated by the letter $f^2$, it may have any marks or characters suitable to the end in view formed in or upon it and in or upon either its outer or its inner face, and, if desired, any marks, characters, or data may be applied thereto by forming them upon a surface, such as a card or paper, which in turn is attached or applied at the inner face of the seal, or, if preferred, to the outer face of the seal.

In use the bolt and its holder are fastened by any suitable means—such as the bolts K—to one part of the structure that is to be sealed—say to the door L—and the keeper and seal-holder to the other part—say the jamb M; but any relative arrangement may be adopted.

5  N is a staple standing out from the plate G, and passing through a slot $n$ in the arm D when the latter is depressed, and O is a headed pin passing into said staple outside of said slot to aid in keeping the arm D depressed.

10  I claim—

1. The combination, with the bolt having a depending arm, of the keeper having the longitudinal stop-lip I, the seal-holder below said keeper provided with a vertical space or recess to receive the bolt-arm when depressed, the seal fitting into a recess in the seal-holder outside of the bolt-arm recess and provided with notches in its edges, and catches or bolts to engage in said notches and prevent the seal from being withdrawn, substantially as specified.

2. The combination of the bolt having a depending arm provided with the slot $n$, the seal-holder provided with a vertical recess to receive said arm when depressed, the seal fitting and retained by suitable means in a recess in the seal-holder outside of the bolt-recess, the staple N, passing into the slot $n$, and the pin O, fitting in said staple, substantially as specified.

3. The combination of the bolt having a depending arm, the seal-holder having a vertical space or recess to receive said arm when depressed, the seal fitting into a recess in said holder outside of the bolt-recess and provided with notches in its side edges, and the spring-controlled bolts situated in recesses in the holder and beveled at their ends in such manner as to permit the insertion of the seal and prevent its withdrawal, substantially as specified.

Witness my hand this 6th day of January, 1890.

THOMAS R. ROEMER.

Witnesses:
C. D. MOODY,
JAS. E. GRACEY.